Sept. 27, 1932.  J. C. SCHAF, JR  1,879,530
BATTERY AND GENERATOR TESTING APPARATUS FOR MOTOR VEHICLES
Filed April 19, 1930
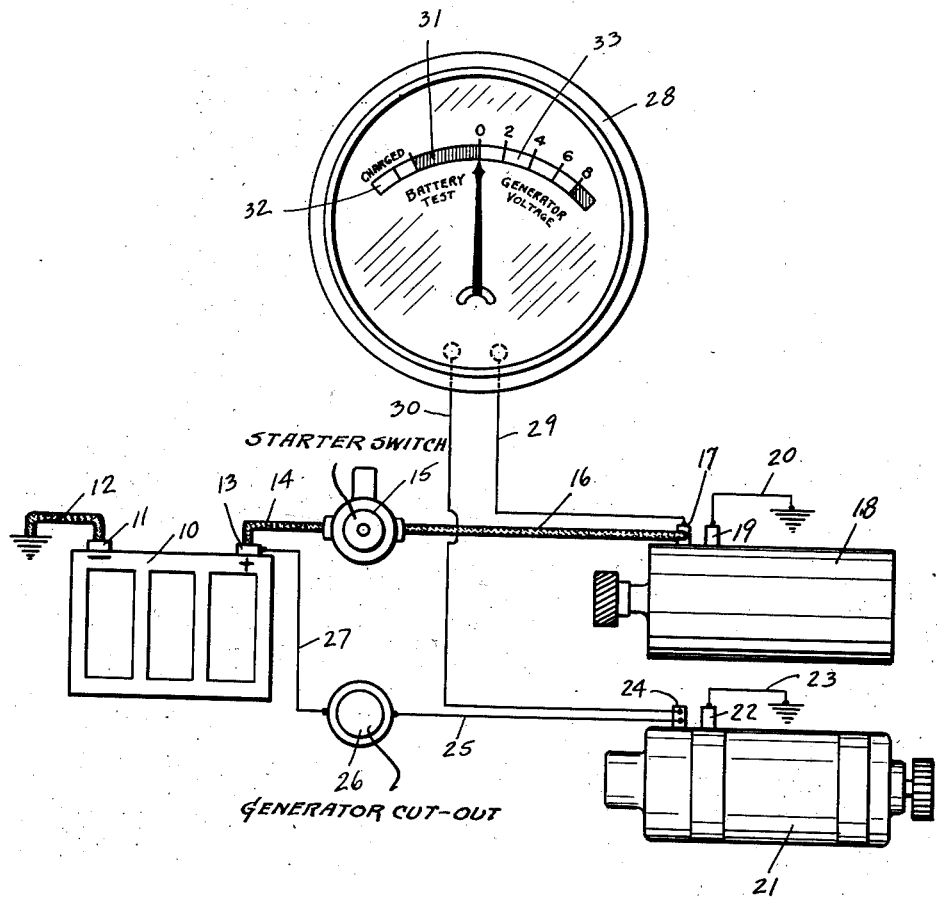
INVENTOR.
JOSEPH C. SCHAF, JR.
BY
Lockwood Lockwood Goldsmith & Galt
ATTORNEYS.

Patented Sept. 27, 1932

1,879,530

UNITED STATES PATENT OFFICE

JOSEPH C. SCHAF, JR., OF INDIANAPOLIS, INDIANA

BATTERY AND GENERATOR TESTING APPARATUS FOR MOTOR VEHICLES

Application filed April 19, 1930. Serial No. 445,536.

This invention relates to battery and generator testing apparatus particularly for use in motor vehicles.

The principal object of the invention is to provide means by which a single meter, preferably mounted upon the dash board of a vehicle, may be used to indicate the condition of charge of the starting and ignition battery and also the performance of the generator in charging the battery. The said meter is connected so that a reading is obtained thereon for indicating the condition of charge of the battery each time that the starter switch is operated to start the engine. When the starter switch is released and the engine has come up to sufficient speed so that the generator charges the battery, the meter is automatically connected to give an indication of the performance of the generator. This arrangement takes the place of the ammeter heretofore used for indicating the rate of charge and discharge from the battery. Unlike the said ammeter, it provides an indication of the actual condition of the battery rather than an indication of the rate of current flow therefrom. Thus, the owner of the car is saved the worry and inconvenience of having the battery tested when uncertain as to its condition. He is also spared the danger of having a dead battery at a critical time since he is constantly informed of the condition of the battery.

Other objects and features of the invention and the full nature thereof will be understood from the accompanying drawing and the following description and claims:

The drawing is a diagrammatic representation of the battery, starting motor, generator and the electrical connections thereto of a motor vehicle having applied thereto the meter and connections herein described.

The storage battery 10 has its negative terminal 11 grounded upon the frame of the car by a connection 12. The positive terminal 13 of the battery is connected by a wire 14 to a starter switch 15 of the usual form. The said switch is connected by a wire 16 to a terminal 17 of the starting motor 18. The opposite terminal 19 of the said starting motor is grounded by wire 20 to the frame of the car.

A generator 21 of the form common in automotive practice has one terminal 22 grounded to the frame of the car by the connection 23. The opposite terminal 24 of the generator is connected by a wire 25 to a cutout switch 26 of common form which is in turn connected by wire 27 to the positive terminal 13 of battery 10. The cutout switch operates in a well known manner to break the connection between wires 25 and 27 when the generator 21 is operating so slowly that the voltage generated thereby is less than the voltage of the battery 10.

A meter 28 is mounted upon the dash board of the car or any other convenient position and has one terminal connected by a wire 29 to the terminal 17 of the starting motor and another terminal connected by wire 30 with the terminal 24 of the generator. The meter 28 is a voltmeter of any well known design adjusted to have its zero point at the center of the scale as illustrated in the drawing. The instrument is, therefore, adapted to indicate both positive and negative differences in voltage between the lines 29 and 30. The meter is connected so that the pointer moves to the left when line 29 is at a higher potential than line 30 and moves to the right when line 30 is at the higher potential.

When the engine of the car is at rest, the cut-out switch 26 is open and the generator is idle. The internal electrical resistance of the generator is extremely small so that in effect there is at that time a direct connection through the wire 30, the generator 21, the connection 23, the frame of the car and wire 12 to the negative battery terminal 11. When the starter switch 15 is operated to start the motor 18, the wire 29 is directly connected through wires 16, switch 15 and wire 14 to the positive terminal 13 of the battery. Thus the line 29 assumes a potential above the line 30 equal to the output voltage of the battery and the voltmeter pointer swings to the left giving an indication of the said voltage. During this time, the motor 18 is operating to turn over the engine. Since the current drawn by the said motor is substantially constant for this operation, this connection gives a so-called high rate discharge test to the battery and the output voltage of the battery gives an indication of the condition of charge thereof. If the battery is fully charged, a greater deflection of the pointer will be obtained than if the battery is in need of recharging. The left hand portion of the scale of the meter 28 may, therefore, be divided into two parts 31 and 32 as indicated in the drawing. The dividing line between the portions 31 and 32 is arbitrarily placed at the point at which the pointer indicates a voltage above which the battery may be considered as fully charged and below which the battery may be considered as in need of recharging. When the battery is fully charged, the pointer will swing to the portion 32 of the scale at each operation of the starter switch. If the battery is in need of charging, the pointer will not swing beyond the portion 31 of the scale. Thus the driver of the car is informed of the exact condition of the battery at each operation of the starting switch.

Other valuable information is given the driver at the same time. For example, if the pointer fails to reach the portion 32 of the scale, although the engine turns over, the driver is informed that his battery has not sufficient charge for effective operation of his ignition system. If the pointer reaches the scale portion 32 but the engine fails to start, the indication is that trouble will be found in the starting motor 18. If no movement of the pointer is obtained, the motor not turning over, an open circuit between the starting motor and battery is indicated.

When the engine has been started, the starter switch released and the starting motor 18 has come to rest, the internal electrical resistance of the said motor is so small that practically a direct connection is formed between the wire 29, the wire 20, the frame of the car, the wire 23 and the terminal 22 of the generator. Thus the meter 28 is directly connected across the terminals of the generator 21, the line 30 being at the higher potential. The pointer of the meter is, therefore, moved to the right hand part 33 of the scale and the deflection thereof indicates the voltage output of the generator. When the generator is operating at sufficient speed to charge the battery, the cutout switch 26 closes and the voltmeter may then be considered to be directly connected across the battery terminals as well as the generator terminals since said terminals are then directly connected.

For several reasons, the generator voltage reading has much more value as an indication of the performance of the generator in charging the battery than the current or ammeter reading heretofore used. The generator voltage is entirely independent of the lights or any other load which may be imposed upon the battery while the current or ammeter reading is not. The safe rate of charging current to be used in charging a battery varies with the condition of charge of the battery. The safe generator voltage to be used does not vary. Therefore, the generator voltage reading indicates the proper charge in a manner not done by an ammeter reading.

By means of the apparatus herein described, it is evident that the driver of a motor vehicle is supplied with a great variety of information not possible with the instruments heretofore in common use and that the said result is obtained without adding another electrical instrument or switch to the car and with an extremely simple wiring connection which may be applied to the electrical system of the car with the minimum of disturbance to its component parts.

The invention claimed is:

1. The combination with a storage battery, of a motor, an electric connection between one terminal of said motor and one terminal of said battery, a switch, electric connections between said switch and the opposite battery terminal and between said switch and the opposite motor terminal, a generator, an electric circuit between one terminal of said generator and the first-mentioned battery terminal, a second switch, electric connections between said second switch and the second-mentioned battery terminal and between said second switch and the opposite terminal of said generator, a meter, an electric connection between one terminal of said meter and the said opposite motor terminal, and an electric connection between the opposite meter terminal and the said opposite generator terminal.

2. The combination with a storage battery, of a motor operable thereby, a generator for charging said battery, switch-controlled circuits connecting said motor and generator respectively with said battery, a center reading voltmeter, an electric connection between one terminal of said voltmeter and one terminal of said motor, an electric connection between the other terminal of said voltmeter and one terminal of said generator, whereby current will pass through said voltmeter in one direction when the motor is operated and in the other direction when the generator is operated.

3. The combination with a storage battery, of a motor, an electric connection between one terminal of said motor and one terminal of said battery, a switch, electric connections between said switch and the opposite battery terminal and between said switch and the opposite motor terminal, a generator, an electric circuit between one terminal of said generator and the first mentioned battery terminal, means to permit current to flow in but one direction, electric connections between said means and the second mentioned battery terminal and between said means and the opposite terminal of said generator whereby current may flow only from the generator to the battery, a center reading voltmeter, an electric connection between one terminal of said meter and the connection between the switch and said opposite motor terminal, and an electric connection between the opposite meter terminal and the connection between said means and said opposite generator terminal.

In witness whereof, I have hereunto affixed my signature.

JOSEPH C. SCHAF, Jr.